United States Patent
Avedisov et al.

(10) Patent No.: US 11,856,453 B2
(45) Date of Patent: Dec. 26, 2023

(54) SYSTEMS AND METHODS FOR CONTEXT-BASED REPRESENTATION OF SENSOR SHARING MESSAGES

(71) Applicant: Toyota Motor Engineering & Manufacturing North America, Inc., Plano, TX (US)

(72) Inventors: Sergei S. Avedisov, Mountain View, CA (US); Onur Altintas, Mountain View, CA (US); Takamasa Higuchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 40 days.

(21) Appl. No.: 17/485,588

(22) Filed: Sep. 27, 2021

(65) Prior Publication Data

US 2023/0098231 A1 Mar. 30, 2023

(51) Int. Cl.
*H04W 28/06* (2009.01)
*H04W 4/40* (2018.01)

(52) U.S. Cl.
CPC ............ *H04W 28/06* (2013.01); *H04W 4/40* (2018.02)

(58) Field of Classification Search
CPC ................................ H04W 4/40; H04W 28/06
See application file for complete search history.

(56) References Cited

U.S. PATENT DOCUMENTS

| | | | |
|---|---|---|---|
| 10,916,135 B2 | 2/2021 | Guo et al. | |
| 2012/0268295 A1 | 10/2012 | Yuse et al. | |
| 2015/0172956 A1 | 6/2015 | Noh et al. | |
| 2016/0217333 A1* | 7/2016 | Ozawa | G08G 1/096783 |
| 2017/0201461 A1 | 7/2017 | Cheng et al. | |
| 2020/0344658 A1* | 10/2020 | Huang | H04W 36/0083 |
| 2021/0067926 A1* | 3/2021 | Hwang | H04W 4/44 |

FOREIGN PATENT DOCUMENTS

| | | |
|---|---|---|
| JP | 2005057442 A | 3/2005 |
| WO | 2018031159 A1 | 2/2018 |

OTHER PUBLICATIONS

Value-anticipating V2V communications for cooperative perception (https://www.researchgate.net/publication/335501836_Value-Anticipating_V2V_Communications_for_Cooperative_Perception); Jun. 2019.

* cited by examiner

*Primary Examiner* — Benyam Haile
(74) *Attorney, Agent, or Firm* — Dinsmore & Shohl LLP

(57) ABSTRACT

In accordance with one embodiment of the present disclosure, a method includes obtaining, with a sensor of a vehicle, a data set representing an external object, the data set having a first set of features, obtaining, with a receiver of the vehicle, a channel load about a radio frequency through which the data set may be transmitted, obtaining, with an environment sensor of the vehicle, context information about a road on which the vehicle is located, and processing the data set representing the external object based on the channel load and the context information to generate a reduced data set representing the external object, the reduced data set having a second set of features fewer than the first set of features.

21 Claims, 7 Drawing Sheets

SYSTEMS AND METHODS FOR CONTEXT-BASED REPRESENTATION OF SENSOR SHARING MESSAGES

TECHNICAL FIELD

The present disclosure relates to data sharing, and more particularly to selective sharing of data based on the context of a vehicle, the surrounding traffic environment, and the load of the communication channel.

BACKGROUND

Connected vehicles and infrastructure use sensor sharing messages (SSM) to provide information about the objects they detect via their sensors. For example, an ego vehicle can detect nearby remote vehicles via sensors (e.g., RADAR and cameras) and then share the position, speed, and acceleration of these remote vehicles via an SSM to other vehicles and/or infrastructure. Collecting large volumes of data from a vehicle's equipped sensors may lead to a more comprehensive perception of the nearby vehicles. However, the large volume of data collected may place a heavy load on networks and servers that the ego vehicle is connected to. As a result, the data may take longer to share, which may also render the data less valuable to vehicles who rely on sensing vehicles in real time.

To remedy the issue, data may be compressed or removed in part. Compressing data may be time consuming and/or too computationally expensive for a vehicle processor, and thus removing unnecessary parts of the data may be the most efficient course of action for transmitting vehicle sensor data. Parts of data may be unnecessary in a variety of situations. The sensory equipment between different connected vehicles may vary, and thus so may the information that some connected vehicles may use about objects another vehicle detects. In some contexts, some information can reasonably be inferred based on the environment. Furthermore, in some instances, the channel load is simply too much to transmit each part of the data and thus the data should be stripped to its more critical components.

Therefore, an efficient strategy for reducing the size of data representing external objects collected by an ego vehicle to suit the environment, channel load, and sensory capabilities of an ego vehicle is desired.

SUMMARY

In accordance with one embodiment of the present disclosure, a vehicle includes a controller. The controller is programmed to perform operations including obtaining a data set representing an external object, the data set having a first set of features, obtaining a channel load about a radio frequency through which the data set may be transmitted, obtaining context information about a road on which the vehicle is located, and processing the data set representing the external object based on the channel load and the context information to generate a reduced data set representing the external object, the reduced data set having a second set of features fewer than the first set of features.

In accordance with another embodiment of the present disclosure, a method includes obtaining, with a sensor of a vehicle, a data set representing an external object, the data set having a first set of features, obtaining, with a receiver of the vehicle, a channel load about a radio frequency through which the data set may be transmitted, obtaining, with an environment sensor of the vehicle, context information about a road on which the vehicle is located, and processing the data set representing the external object based on the channel load and the context information to generate a reduced data set representing the external object, the reduced data set having a second set of features fewer than the first set of features.

Although the concepts of the present disclosure are described herein with primary reference to highways and cars, it is contemplated that the concepts will enjoy applicability to any terrain and vehicle. For example, and not by way of limitation, it is contemplated that the concepts of the present disclosure will enjoy applicability to rivers and boats.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include methods and systems for context-based representation of sensor sharing messages (SSM). Connected vehicles and infrastructure use SSMs to provide information about the objects they detect via their sensors. For example, an ego vehicle can detect nearby remote vehicles via sensors (e.g., RADAR and cameras) and then share the position, speed, and acceleration of these remote vehicles via an SSM to other vehicles and/or infrastructure. Collecting large volumes of data from a vehicle's equipped sensors may lead to a more comprehensive perception of the nearby vehicles. However, the large volume of data collected may place a heavy load on networks and servers that the ego vehicle is connected to. As a result, the data may take longer to share, which may also render the data less valuable to vehicles that rely on sensing vehicles in real time.

In embodiments disclosed herein, an ego vehicle may contain a detected object container forming module to determine context-based object representations based on the inputs received from the sensor module, the network connectivity module, and/or the location module. The detected object container forming module receives sensor data from the sensor module regarding objects nearby the ego vehicle. The data object container forming module may strip down the sensor data based on radio channel and/or location contexts as determined by the network connectivity module and/or the location module. The result is a context-based object representation output by the detected object container forming module. The context-based object representation output may be received by the SSM compilation module for preparation to be shared to other connected vehicles via the network connectivity module.

Figure 1:
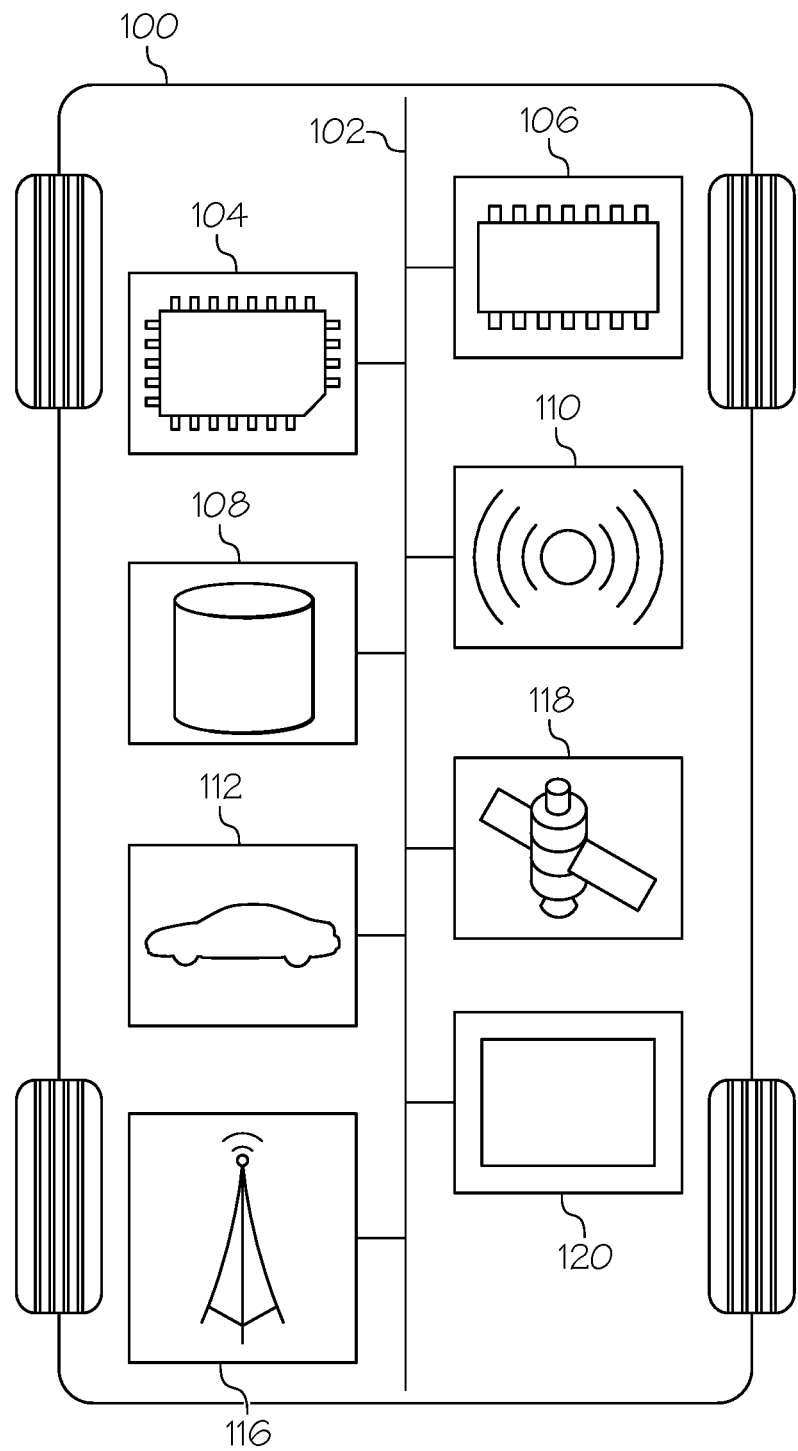
FIG. 1 depicts an example vehicle system, according to one or more embodiments shown and described herein.
Figure 2:
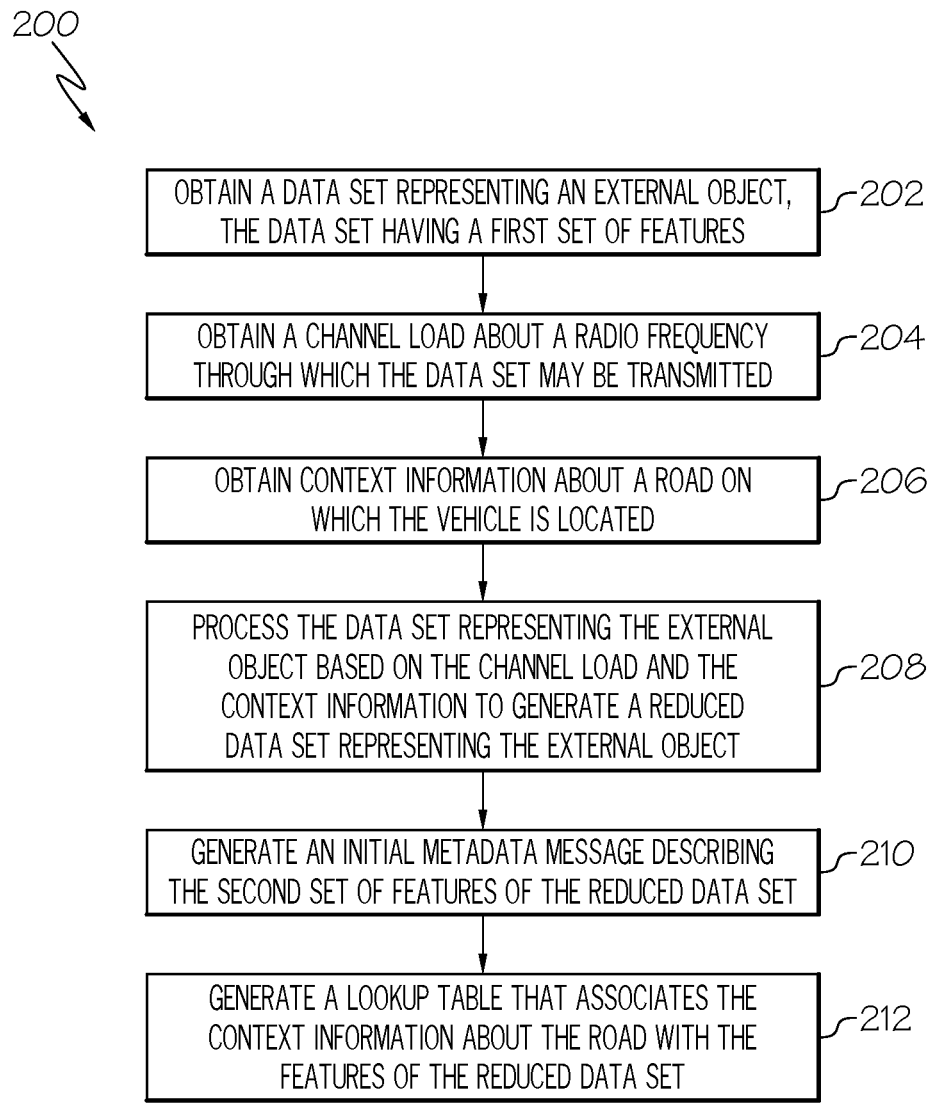
FIG. 2 depicts a flowchart of an example method for reducing the size of data representing external objects collected by the vehicle of FIG. 1, according to one or more embodiments shown and described herein.
Figure 3:
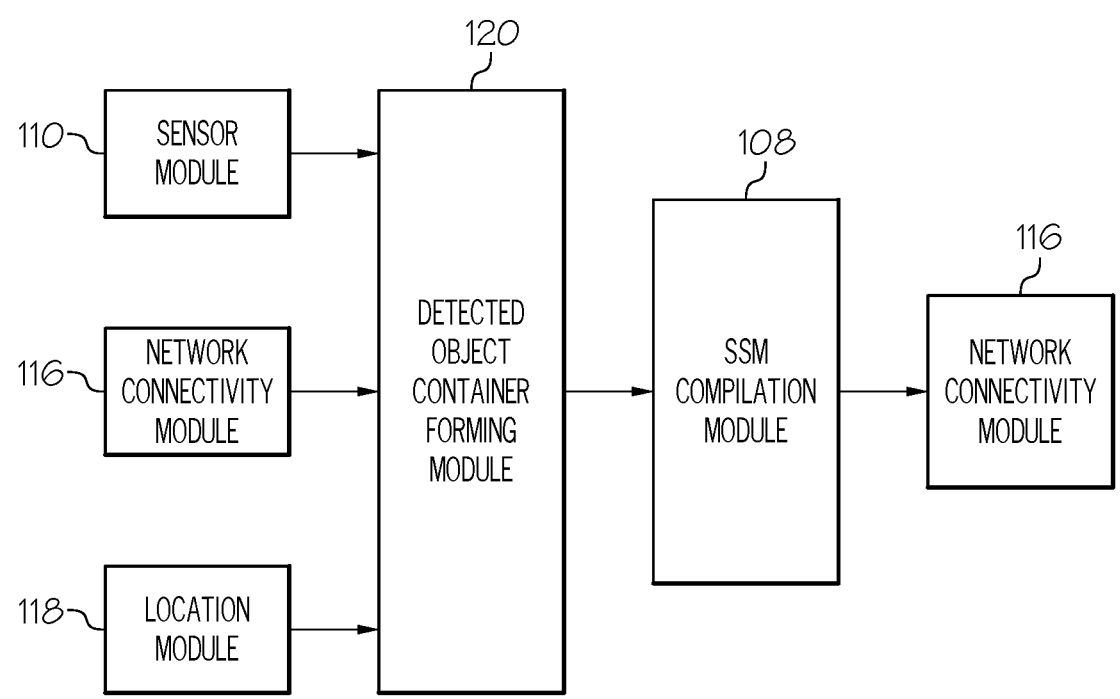
FIG. 3 depicts a flowchart of vehicle components performing the example method of FIG. 2, according to one or more embodiments shown and described herein.
Figure 4:
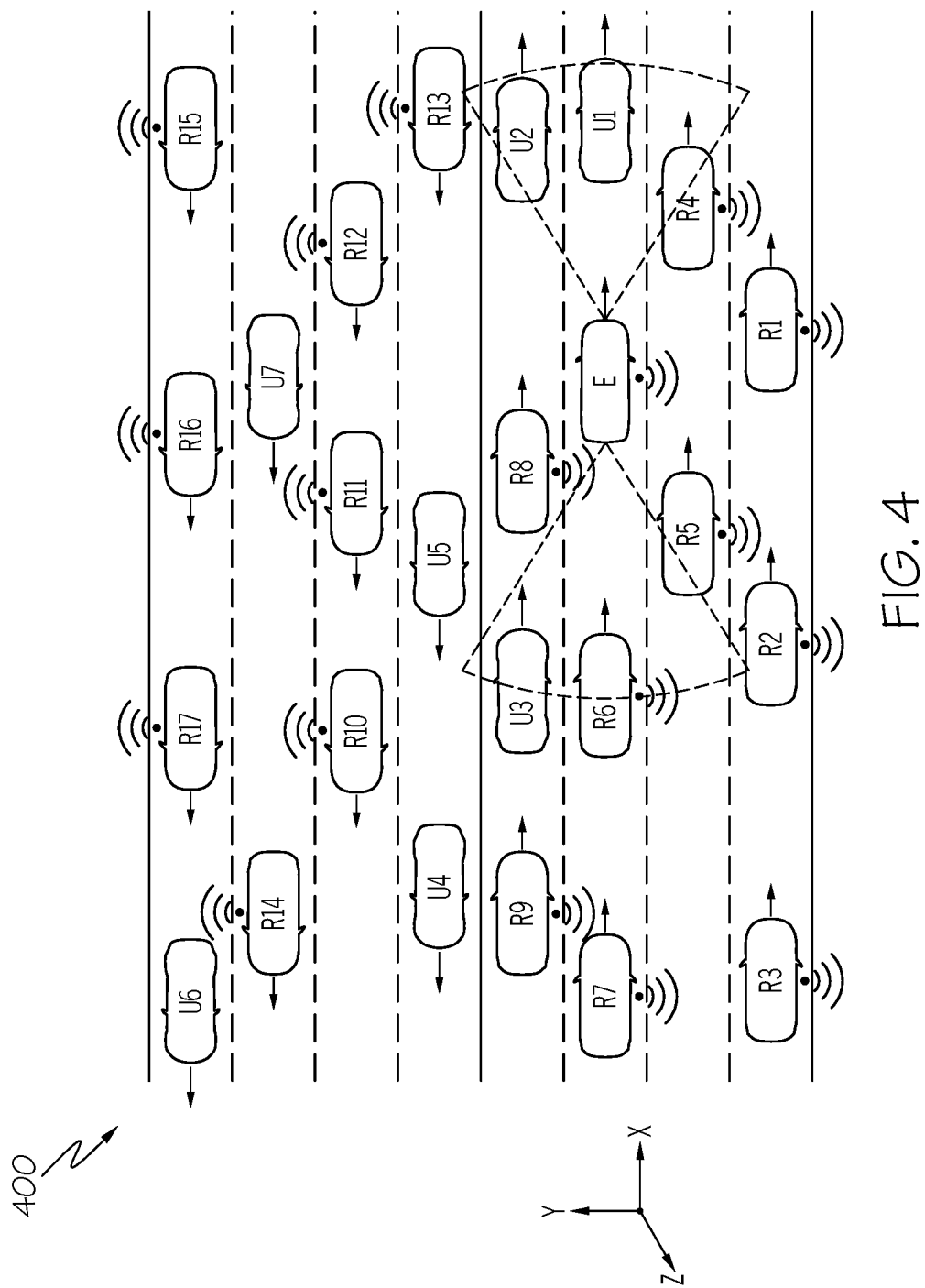
FIG. 4 depicts a plurality of connected vehicles and unconnected vehicles on a flat roadway, according to one or more embodiments shown and described herein.
Figure 5:
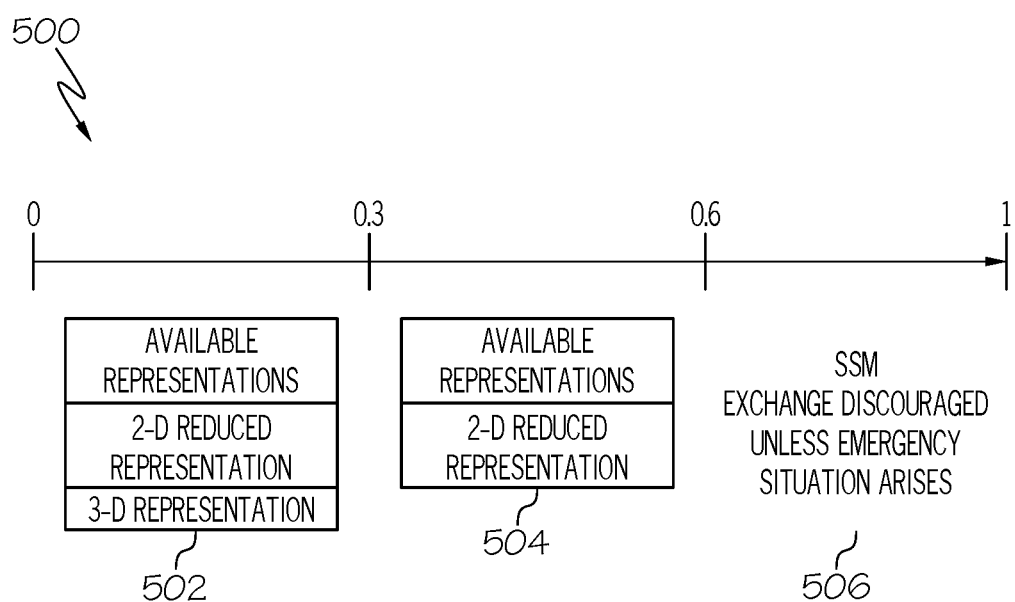
FIG. 5 depicts a spectrum of channel busy ratios and corresponding data representations, according to one or more embodiments shown and described herein.
Figure 6:
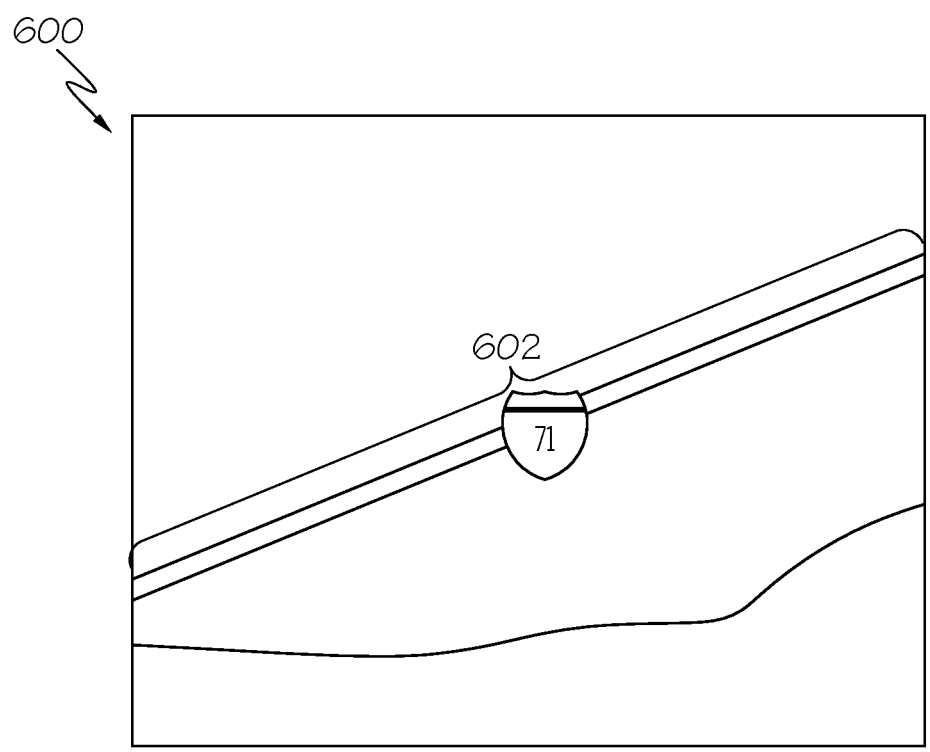
FIG. 6 depicts an example scenario including a single, flat roadway, according to one or more embodiments shown and described herein.
Figure 7:
FIG. 7 depicts an example scenario including multiple, overlapping roadways, according to one or more embodiments shown and described herein.

As described in detail herein, an ego vehicle may contain the components as shown in FIGS. 1 and 3. The ego vehicle may generate context-based object representations according to the method as shown in FIG. 2. Examples of the ego vehicle generating context-based object representations according to the methods as described herein are shown in FIGS. 4-7. Particularly, the ego vehicle sharing fully expressive object representations and a variety of partially expressive object representations are shown in FIG. 4, the effects of channel load on object representations are shown in FIG. 5, and the effects of location on object representations are shown in FIGS. 6-7.

Referring now to FIG. 1, an example connected vehicle 100 system is depicted. The connected vehicle 100 may be an automobile such as a terrestrial vehicle, an aquatic vehicle, an aerial vehicle, or any other passenger or non-passenger vehicle. In some embodiments, the vehicle is an autonomous vehicle that navigates its environment with limited or no human input. The connected vehicle 100 may include a processor 104, a memory module 106, a sensor module 110, a driving assist module 112, a network connectivity module 116, a location module 118, a detected object container forming module 120, and an SSM compilation module 108. The connected vehicle 100 also may include a communication path 102 that communicatively connects the various components of the connected vehicle 100.

The processor 104 may include one or more processors that may be any device capable of executing machine-readable and executable instructions. Accordingly, each of the one or more processors of the processor 104 may be a controller, an integrated circuit, a microchip, or any other computing device. The processor 104 is coupled to the communication path 102 that provides signal connectivity between the various components of the connected vehicle. Accordingly, the communication path 102 may communicatively couple any number of processors of the processor 104 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 102 may be formed from any medium that is capable of transmitting a signal such as, e.g., conductive wires, conductive traces, optical waveguides, and the like. In some embodiments, the communication path 102 may facilitate the transmission of wireless signals, such as Wi-Fi, Bluetooth®, Near-Field Communication (NFC), and the like. Moreover, the communication path 102 may be formed from a combination of mediums capable of transmitting signals. In one embodiment, the communication path 102 comprises a combination of conductive traces, conductive wires, connectors, and buses that cooperate to permit the transmission of electrical data signals to components such as processors, memories, sensors, input devices, output devices, and communication devices. Accordingly, the communication path 102 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory module 106 is coupled to the communication path 102 and may contain one or more memory modules comprising RAM, ROM, flash memories, hard drives, or any device capable of storing machine-readable and executable instructions such that the machine-readable and executable instructions can be accessed by the processor 104. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory module 106. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The connected vehicle 100 also comprises the sensor module 110. The sensor module 110 is coupled to the communication path 102 and communicatively coupled to the processor 104. The sensor module 110 may include, e.g., LiDAR sensors, RADAR sensors, optical sensors (e.g., cameras), laser sensors, proximity sensors, location sensor, and the like. The sensor module 110 may also include sensors for determining the orientation of the connected vehicle 100, such as a gyroscope, a compass, and the like. Sensed orientations include translational position and rotational position. Translational position may include position, velocity, and acceleration, each in up to three dimensions. Rotation position may include Euler angles, angular velocity, and angular acceleration, each in up to three dimensions. In embodiments, the sensor module 110 may monitor the surroundings of the connected vehicle 100 and may detect other vehicles and/or traffic infrastructure. The sensor module 110 may also determine the orientation of the other vehicles, including translational position and rotational position.

The connected vehicle 100 may also include a driving assist module 112, and the data gathered by the sensor module 110 may be used by the driving assist module 112 to assist the navigation of the vehicle. The data gathered by the sensor module 110 may also be used to perform various driving assistance including, but not limited to advanced driver-assistance systems (ADAS), adaptive cruise control (ACC), cooperative adaptive cruise control (CACC), lane change assistance, anti-lock braking systems (ABS), collision avoidance system, automotive head-up display, and the like. The information exchanged between vehicles may include information about a vehicle's speed, heading, acceleration, and other information related to a vehicle state.

The connected vehicle 100 also comprises a network connectivity module 116 that includes network connectivity hardware for communicatively coupling the connected vehicle 100 to other network-attached devices, such as connected vehicles, connected infrastructure, and the like. The network connectivity module 116 can be communicatively coupled to the communication path 102 and can be any device capable of transmitting and/or receiving data via a network or other communication mechanisms. Accordingly, the network connectivity module 116 can include a communication transceiver for sending and/or receiving any wired or wireless communication. For example, the network connectivity hardware of the network connectivity module 116 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices.

The connected vehicle 100 may connect with one or more other connected vehicles and/or external processing devices (e.g., a server) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

A location module 118 is coupled to the communication path 102 such that the communication path 102 communicatively couples the location module 118 to other modules of the connected vehicle 100. The location module 118 may comprise one or more antennas configured to receive signals from global positioning system (GPS) satellites or any other satellite system. Specifically, in one embodiment, the location module 118 includes one or more conductive elements that interact with electromagnetic signals transmitted by GPS satellites. The received signal is transformed into a data signal indicative of the location (e.g., latitude and longitude) of the location module 118, and consequently, the connected vehicle 100.

A detected object container forming module 120 is coupled to the communication path 102 and serves to form the data container for a detected object. The detected object container forming module 120 is a software and/or hardware module that receives data from the sensor module 110, which may include dynamic information about nearby detected objects and other processed object data. The detected object container forming module 120 may also receive context information from the network connectivity module 116, the location module 118, and/or other modules of the connected vehicle 100. The network connectivity module 116 may gather information including channel load (e.g., channel busy ratio) and/or information about other objects being broadcasted by SSMs between other vehicles, and this information may be passed as input to the detected object container forming module 120. The location module 118 may gather the current position, speed, heading, and/or the like of the connected vehicle 100 and may also determine the location of the connected vehicle 100 relative to roads, infrastructure, and/or the like to pass as input to the detected object container forming module 120. The detected object container forming module 120 may combine information from the various modules to complement the input data. For example, the detected object container forming module 120 may determine the absolute position of a remote object by offsetting the data from location module 118 with the data regarding the remote object from the sensor module 110. The detected object container forming module 120 receives object data, channel load, broadcasted information about remote objects, and location of the connected vehicle 100 relative to roads, infrastructure, buildings, and the like to reduce the representation of remote objects and thus reduce the number of bytes that must be transmitted from the connected vehicle 100.

An SSM compilation module 108 is coupled to the communication path 102 and serves to compile the detected object container into an SSM for transmission. SSMs are messages based on V2X sensor-sharing for cooperative and automated driving. The SSM compilation module 108 may receive the output of the detected object container forming module 120 and convert the reduced representation of remote objects into an SSM message suitable for V2X-entities (e.g., RSUs, vehicles, and the like) to describe the detected object (e.g., road users, road obstacles, road impairments, and the like). The SSM compilation module 108 may also generate a metadata message comprising the format of the SSM message to indicate to the recipient what data is included in the SSM message and/or how the SSM message is formatted.

Referring now to FIG. 2, a flowchart of an example method 200 for reducing the size of data representing external objects collected by the vehicle of FIG. 1 is depicted. In block 202, the processor 104 obtains a data set representing an external object. For example, the processor 104 communicatively coupled to sensor module 110, via communication path 102, may receive sensor data regarding a sensed external object, such as a car in a neighboring lane. The data set has a first set of features. Features may include position, velocity, acceleration, and/or any other translational position data. Features may also or instead include Euler angles, angular velocity, angular acceleration, and/or any other rotational position data. In some embodiments, all or part of the data set and/or features representing the external object may originate from roadway infrastructure or from another vehicle. For example, the sensor module 110 may determine rotational position data of the external object and the processor 104 may receive the translational position data of the external object from another connected vehicle.

In block 204, the processor 104 obtains a channel load about a radio frequency through which the data set may be transmitted. The connected vehicle 100 may connect with one or more other connected vehicles and/or external processing devices (e.g., a server) via a direct connection. The direct connection may be a V2V connection or a V2X connection. The V2V or V2X connection may be established using any suitable wireless communication protocols discussed above, which may include a radio frequency through which the data set may be transmitted. The network connectivity module 116 may determine which frequency the data is to be transmitted as well as the channel load of the frequency. To determine the channel load, the network connectivity module 116 may calculate a channel busy ratio. In some embodiments, the channel load may be determined by roadway infrastructure or from another vehicle.

In block 206, the processor 104 obtains context information about a road on which the connected vehicle 100 is located. The location module 118 may determine the location of the connected vehicle 100. With the determined location, the processor 104 may determine the road on which the connected vehicle 100 is driving. For example, the processor 104 may reference a database of roads (e.g., a map) to find a road corresponding to the GPS location of the connected vehicle 100. The processor 104 may also determine road configuration information about the road on which the connected vehicle 100. For example, the road configuration information may include the layers of road (e.g., at an interchange), the number of lanes, the direction of traffic, the curvature of the road, and any other information related to the layout of the road. Obtaining the context information about the road may also or instead include generating a current position, a current speed, and/or a current heading of the connected vehicle 100 with an environment sensor, such as the location module 118 and/or the sensor module 110, and inferring the configuration of the road based on data from the environment sensor. For example, the processor 104 may infer that the configuration of the road is curved based on changing yaw positions of the connected vehicle 100 and is on uneven terrain based on changing pitch positions of the connected vehicle 100.

In block 208, the processor 104 processes the data set representing the external object to generate a reduced data set representing the external object. The processing is based on the channel load and/or the context information. If the processing is based on the channel load, the data set may be reduced to lower dimensional sets of data the higher the channel load is. For example, if the channel is busy (i.e., has a high channel load), then the processor 104 may reduce the data set to a two-dimensional representation rather than the full three-dimensional representation. If the processing is based on context information, the data set may be reduced to reduce potential redundancies or remove low value data. For example, if the rotational position data of the connected vehicle 100 indicates that the connected vehicle 100 is on a flat road, the processor 104 may remove all rotational angle data except for yaw to reduce the amount of low value data. The result of the processing of block 208 is a reduced data set having a second set of features. The second set of features may be a subset of the first set of features. Accordingly, the second set of features may have fewer features than the first set of features.

In some embodiments, the process may proceed to block 210. In block 210, the processor 104 generates an initial metadata message describing the second set of features of the reduced data set. The initial metadata message may describe which features from the first set of features are included in the second set of features. The initial metadata message may also describe the ordering and/or structure of the object representation. For example, the initial metadata message may describe which data element is position, velocity, acceleration, and the like. Furthermore, the initial metadata message may be a baseline data format based on the current channel load and road topology, road geometry, traffic situation, and the like. The initial metadata message may also be an alternative data format where the connected vehicle 100 may represent some object types using a different representation.

In some embodiments, the process may proceed to block 212. In block 212, the processor 104 generates a lookup table that associates the context information about the road with the features of the reduced data set. To recall, context information may include the location, position, speed, and/or heading of the connected vehicle 100, and/or the road configuration. Road configuration information may be inferable from context information regarding the connected vehicle 100. The context information may be the context information obtained in block 206 to generate a reduced data set in block 208. The content and/or format of the reduced data set may be stored in a look up table indexed by the location of the road so that the connected vehicle 100 does not need to determine a new reduced data set, thereby making the process more efficient. In some embodiments, the initial metadata message generated in block 210 may also be the format for the information in the look up table.

Referring now to FIG. 3, a flowchart of vehicle components performing the example method 200 of FIG. 2 is depicted. The sensor module 110 generates a data set representing an external object. The data set may include translational position data and/or rotational position data. The processor 104 and/or sensor module 110 may process the raw data set into a format for use by the detected object container forming module 120. For example, the raw data set may be arranged into a data structure, a file type, a database, and/or any other computer readable format. Simultaneously or subsequently, the network connectivity module 116 may determine a channel busy ratio and/or information about other objects being broadcasted by SSMs or other wireless messages. The channel busy ratio and/or the amount of information broadcast by SSMs or other wireless messages may be an indication to the detected object container forming module 120 of how busy radio channels are. Simultaneously or subsequently, the location module 118 may determine the location of the connected vehicle 100 including speed, position, and/or heading. With the determined location, the processor 104 may determine the road that the connected vehicle 100 is on as well as the location of the vehicle relative to roads, infrastructure, buildings, and the like. The determined location may be used to determine a road configuration information about the road that the connected vehicle 100 is on such as layers of road, number of lanes, direction of traffic, and any other information related to the layout of the road.

The data output by the sensor module 110, the network connectivity module 116, and the location module 118 may be received as input by the detected object container forming module 120. The detected object container forming module 120 may containerize the input data based on the busyness of the radio channels as determined by the network connectivity module 116. Containerizing the input data includes determining a context-based object representation based on the input received from the sensor module 110, the network connectivity module 116, and/or the location module 118 (i.e., the input data). The detected object container forming module 120 may determine a reduced data set of the data set from the sensor module 110 based on context information from the network connectivity module 116 and/or the location module 118. If the processing is based on the channel load, the data set may be reduced to lower dimensional sets of data the higher the channel load is. If the processing is based on location, the data set may be reduced to reduce potential redundancies or remove low value data. The output of the detected object container forming module 120 is a reduced data set having a second set of features. The second set of features may be a subset of the first set of features of the data set from the sensor module 110. Accordingly, the second set of features may have fewer features than the first set of features.

The reduced data set output from the detected object container forming module 120 may be received as input by the SSM compilation module 108. The SSM compilation module 108 compiles the reduced data set into an SSM for transmission. The reduced data set may have additional information added to support an SSM format. For example, header information may be added to the reduced data set indicating the reduced data set's intended recipient. The reduced data set may also be packetized for supporting transmission. For example, the reduced data set may be broken into packets for transmission over a packet-switched network, wherein the recipient reassembles the packets to form the reduced data set. The SSM compilation module 108 may also generate a metadata data message to establish the reduced data set format with the intended recipient so that the recipient can appropriately process the data. Once the SSM is formed, the SSM is sent to the network connectivity module 116 for transmission.

Referring now to FIG. 4, an example scenario 400 having a plurality of connected vehicles and unconnected vehicles on a flat road is depicted. The connected vehicle 100 (also referred to as the ego vehicle E) is detecting several remote vehicles, including connected vehicles R4, R5, R6, and unconnected vehicles U1, U2, U3. The road is flat, meaning that there are approximately no elevation or curvature changes. As the ego vehicle E travels down the road, the sensor module 110 measures the positions of the remote vehicles surrounding the ego vehicle E (e.g., R4, R5, R6, U1, U2, U3). In some embodiments, the sensor module 110 may also determine the associated errors and covariance of the position data. The position data may include translational position data including position, velocity, and acceleration, each in up to three dimensions. The translational position data may be represented as $$x = \begin{bmatrix} x \\ y \\ z \end{bmatrix}, \dot{x} = \begin{bmatrix} \dot{x} \\ \dot{y} \\ \dot{z} \end{bmatrix}, \ddot{x} = \begin{bmatrix} \ddot{x} \\ \ddot{y} \\ \ddot{z} \end{bmatrix}$$

where x is position, $\dot{x}$ is velocity, and $\ddot{x}$ is acceleration. The rotational position data may be represented as $\phi$, $\theta$, $\psi$, $$\omega = \begin{bmatrix} \dot{\phi} \\ \dot{\theta} \\ \dot{\psi} \end{bmatrix}, \dot{\omega} = \begin{bmatrix} \ddot{\phi} \\ \ddot{\theta} \\ \ddot{\psi} \end{bmatrix}$$

where $\phi$, $\theta$, $\psi$ is each Euler angles roll, pitch, and yaw, $\omega$ is angular velocity, and $\dot{\omega}$ is angular acceleration. The data set representing the position data may thus have 18 features to be sent per detected object. Accordingly, the covariance would be an 18 by 18 symmetric matrix, consisting of 171 elements. Assuming a 4 byte representation of each element/feature, the total size of the data set would be 756 bytes per detected object. Further assuming an upload speed of 3G cellular connectivity's peak upload speed (i.e., 2 Mbit/s), the time to transfer the data set of one detected object would be approximately 0.003 seconds.

The detected object container forming module 120 may reduce the representation of detected objects based on the input received from the sensor module 110, the network connectivity module 116, and/or the location module 118. For example, the network connectivity module 116 may determine a channel load of frequencies that may be used to transmit each data set. In the example of FIG. 4, because each connected vehicle is transmitting, the network connectivity module 116 may determine that the channel load is high. High channel load may result in decreased bandwidth and/or latency, and SSMs containing fewer data may be less impacted by the high channel load. This would mean that reducing the representation of detected objects in the SSMs from ego vehicle E would be beneficial. The detected object container forming module 120 of the ego vehicle E may receive the channel load from the network connectivity module 116 and reduce the representation of remote objects. For example, instead of including translational position data and rotational position data in three dimensions, only two dimensions may be included such that the translational position may include $$x = \begin{bmatrix} x \\ y \end{bmatrix}, \dot{x} = \begin{bmatrix} \dot{x} \\ \dot{y} \end{bmatrix}, \ddot{x} = \begin{bmatrix} \ddot{x} \\ \ddot{y} \end{bmatrix}$$

and the rotational position may include $\phi$ and $\psi$ $$\omega = \begin{bmatrix} \dot{\phi} \\ \dot{\psi} \end{bmatrix}, \dot{\omega} = \begin{bmatrix} \ddot{\phi} \\ \ddot{\psi} \end{bmatrix}.$$

This reduces the number of features to transmit from 18 to 12. The covariance matrix would now just be 78 elements, rather than the full 171 elements.

As another example, the location module 118 may determine that the ego vehicle E is on a flat road. To reduce the data set, and thus the representation of a remote object, the detected object container forming module 120 may remove unnecessary data or data that is inferable based on the environment. Because the road is flat, the translational position of an object will not move in a direction along a Z-axis and its roll $\phi$ and pitch $\theta$ will not change. This indicates that the ego vehicle E does not need to transmit the Z coordinate or the roll $\phi$ and pitch $\theta$ motions. The ego vehicle E could just transmit $$x = \begin{bmatrix} x \\ y \end{bmatrix}, \dot{x} = \begin{bmatrix} \dot{x} \\ \dot{y} \end{bmatrix}, \ddot{x} = \begin{bmatrix} \ddot{x} \\ \ddot{y} \end{bmatrix}$$

and $\psi$, $\dot{\psi}$, and $\ddot{\psi}$. This reduces the number of features to transmit from 18 to 9. The covariance matrix would now just be 45 elements, rather than the full 171 elements. In terms of data size, the ego vehicle E would only need to transmit 216 bytes, rather than the full 756 bytes (assuming the same 4 bytes per element/feature).

As yet another example, the sensor module 110 may determine that the detected object is a stationary or parked object. To reduce the data set, and thus the representation of a remote object, the detected object container forming module 120 may remove unnecessary data or data that is inferable based on the environment. Because a stationary or parked object is not moving, its velocity and acceleration will be zero. The ego vehicle E could just transmit $$x = \begin{bmatrix} x \\ y \\ z \end{bmatrix}.$$

This reduces the number of features to transmit from 18 to 3. The corresponding covariance matrix would now just be 6 elements, rather than the full 171 elements. In terms of data size, the ego vehicle E would only need to transmit 36 bytes, rather than the full 756 bytes (assuming the same 4 bytes per element/feature).

As mentioned, the sensor module 110 may determine the covariance matrix for the reduced dataset. Continuing with the previous example, the covariances for the accelerations and the yaw rate are higher than a predetermined covariance threshold, which means that these quantities would not aid remote vehicles after being transmitted. As a result, just five features should be transmitted per detected object:

$$x = \begin{bmatrix} x \\ y \end{bmatrix}, \dot{x} = \begin{bmatrix} \dot{x} \\ \dot{y} \end{bmatrix}$$

and ψ. This reduces the number of features to transmit from 18 to 5. The corresponding covariance matrix is then just 15 elements. In terms of data size, the ego vehicle E would only need to transmit just 80 bytes (assuming the same 4 bytes per element/feature).

In some embodiments, the detected object container forming module 120 may determine whether the data is valuable to potential recipients. The detected object container forming module 120 may analyze the covariance of particular features to determine whether they exceed a threshold value. The detected object container forming module 120 may also or instead determine whether transmitting the detected features with the given covariance improves the predicted accuracy to which remote vehicles know about the object.

In some embodiments, the detected object container forming module 120 may determine object representations of other vehicles based on the relative distances between the ego vehicle E and other vehicles. For example, the ego vehicle E may detect vehicles R4 and U1. Because R4 is closer to the ego vehicle E than vehicle U1, data about U1 may include more noise than data about R4. Increased noise may reduce the value of the data. Accordingly, the ego vehicle E may transmit five positional features of vehicle R4 but only two positional features of vehicle U1 (e.g., X and Y position).

After the format for the reduced data set is determined, the SSM compilation module 108 may generate an initial metadata message describing the set of features of the reduced data set to be transmitted. The metadata message may also describe the format of the SSM, such as which data element is position, velocity, acceleration, and the like. The metadata message may be a separate message and/or included in the SSM. The format for the reduced data set may be a baseline data format for the particular road. The metadata message may be sent to indicate the baseline data format for a given locality and channel load. The metadata message might contain additional information such as the area and the time at which the baseline data format is applicable.

In some embodiments, the format for the reduced data set may be attributed to a particular section of road so that vehicles do not need to determine what the format for the reduced data set should be each time vehicles pass that particular section of road. The format for the reduced data set may be stored in a lookup table that associates the context information about the road (e.g., location) with the features included in the reduced data set (e.g., X and Y position and yaw). The lookup table may be stored in a location that can be referenced by multiple vehicles. For example, the lookup table may be stored in a server.

However, occasionally the ego vehicle E may represent some objects using a different representation in an alternative data format, which may comprise more or less data. For example, if an object is detected going in a different direction than the flow of traffic, this may be an emergency situation for which the ego vehicle E may transmit more data in an alternative data format. As another example, if vehicles U2 and U3 do not significantly change their velocity or heading, the ego vehicle E may make transmit fewer data in an alternative data format $$x = \begin{bmatrix} x \\ y \end{bmatrix}.$$

Representing vehicles U2 and U3 just by the position would result in a payload of 20 bytes per object (two features and three covariance features, assuming four bytes per feature). Once the baseline data format is established, the ego vehicle E can also send a control message about an alternative data format, if it determines that an alternative data format can allow for a significantly smaller channel payload to justify the transmission of this additional control message.

Referring now to FIG. 5, a spectrum 500 of channel busy ratios and corresponding data representations are depicted. Embodiments may have predetermined tiers of channel loads and their respective data representations. For example, the tiers shown in FIG. 5 include a first tier 502 covering a channel busy ratio from 0 to 0.3, a second tier 504 covering a channel busy ratio from 0.3 to 0.6, and a third tier 506 covering a channel busy ratio from 0.6 to 1, where 0 indicates the lowest channel load and 1 indicates the highest channel load. The network connectivity module 116 may calculate a channel busy ratio. In some embodiments, the channel load may be determined by roadway infrastructure or from another vehicle. As shown in FIG. 5, the first tier 502 represents the lowest range of channel load. Because the first tier 502 is when radio performance is expected to be at its best, the connected vehicle 100 may transmit a data set at any available representation, such as a full three-dimensional representation comprising 18 positional features and 171 covariance elements. The connected vehicle 100 may also or instead transmit a two-dimensional representation. In some embodiments, the connected vehicle 100 may transmit only the translational position data.

In the second tier 504, the radio performance may be reduced. Sending a full data representation through a radio channel with reduced performance may increase the transmission time, which makes the data less valuable to connected vehicles that rely on receiving data in real-time. Accordingly, the connected vehicle 100 may not transmit the full three-dimensional representation. Instead, the connected vehicle 100 may transmit a two-dimensional representation. The connected vehicle 100 may also or instead transmit any other available representations that consist of features fewer than the two-dimensional representation. For example, the connected vehicle 100 may only transmit translational position data on the X-axis and Y-axis.

In the third tier 506, the radio performance may be so poor that it is not worth transmitting an SSM. For instance, the data in the SSM may be considered stale by the time it arrives at its intended destination due to the heightened channel congestion. Thus, in the third tier 506 of channel busy ratios, SSM exchange may be discouraged. However, SSMs may be designated as critical for an emergency situation. Emergency situations may include situations where a detected object is behaving erratically. For example, a rotational position data of a remote object that has a high yaw acceleration may be representative of a vehicle swerving, and thus it is critical that nearby vehicles respond appropriately to avoid collision with the remote object. As another example, a translation position data of a remote object may indicate that the remote object may be moving in a direction perpendicular to other remote objects, such as an animal crossing the road, and thus it is critical that nearby vehicles respond appropriately to avoid collision with the remote object.

In some embodiments, the first tier 502, the second tier 504, and the third tier 506 may behave as a spectrum, wherein a channel congestion at a higher end of a tier may result in more features being removed from a data representation than a channel congestion at a lower end of a tier. For example, a channel busy ratio of 0.4 may result in the connected vehicle 100 transmitting a two-dimensional representation of a remote object. A channel busy ratio of 0.5, on the other hand, may result in the connected vehicle 100 transmitting only the two-dimensional translational position data and yaw features.

Referring now to FIG. 6, an example scenario 600 including a single flat road 602 is depicted. In addition to or instead of assessing the channel load, the detected object container forming module 120 may assess context information about a road on which the connected vehicle 100 is located to determine how to reduce the representation of the detected object. In this example, connected vehicle 100 is located on a road 602. The connected vehicle 100 may obtain context information about the road 602 directly from a server or inferred from environmental sensors. The context information may include the configuration of the road 602. A road configuration information may include the number of lanes, the direction of traffic, the curvature of the road, and any other information related to the layout of the road. For example, the road 602 is configured as a straight highway on flat terrain. Obtaining the context information about the road 602 may also or instead include generating a current position, a current speed, and/or a current heading of the connected vehicle 100 with an environment sensor, such as the location module 118 and/or the sensor module 110, and inferring the configuration of the road 602 based on data from the environment sensor. For example, driving on the road 602 would result in substantially consistent pitch, roll, and yaw rotational movement, and thus it can be inferred that the road 602 is flat and straight. Because elevation is not a concern on a flat road, the detected object container forming module 120 may reduce the data set to five features:

$$x = \begin{bmatrix} x \\ y \end{bmatrix}, \dot{x} = \begin{bmatrix} \dot{x} \\ \dot{y} \end{bmatrix},$$

and ψ. Although each rotational movement may be substantially consistent, the yaw feature may still be desired to account for the connected vehicle 100 changing lanes.

Referring now to FIG. 7, an example scenario 700 including a group of roads 704 is depicted. In addition to or instead of assessing the channel load, the detected object container forming module 120 may assess context information about a road on which the connected vehicle 100 is located to determine how to reduce the representation of the detected object. In this example, the road on which the connected vehicle 100 is located is a road 702 that exists in a group of roads 704. The connected vehicle 100 may obtain context information about the road 702. The context information may include the configuration of the road 702. Road configuration information may include the layers of road (e.g., at an interchange), the number of lanes, the direction of traffic, the curvature of the road, and any other information related to the layout of the road. For example, the road 702 is configured as an interchange, wherein the interchange is the group of roads 704. Obtaining the context information about the road 702 may also or instead include generating a current position, a current speed, and/or a current heading of the connected vehicle 100 with an environment sensor, such as the location module 118 and/or the sensor module 110, and inferring the configuration of the road 702 based on data from the environment sensor. For example, because the road 702 is an interchange, the connected vehicle 100 may be led onto another road in the group of roads 704 that is oriented in a different direction than road 702 and is positioned in a different vertical position than road 702. When it comes to multiple roads, such as the group of roads 704 at an interchange, it may be desirable to know the altitude for determining the location of the object, as well as the pitch and roll. Therefore, the data set can be reduced to six features:

$$x = \begin{bmatrix} x \\ y \\ z \end{bmatrix}, \dot{x} = \begin{bmatrix} \dot{x} \\ \dot{y} \end{bmatrix},$$

and ψ.

It should now be understood that the embodiments disclosed herein include methods and systems for context-based representation of SSMs. An ego vehicle may contain a detected object container forming module to determine context-based object representations based on the inputs received from the sensor module, the network connectivity module, and/or the location module. The detected object container forming module may receive sensor data from the sensor module regarding objects nearby the ego vehicle. The data object container forming module may strip down the sensor data based on radio channel and/or location contexts as determined by the network connectivity module and/or the location module. The result is a context-based object representation output by the detected object container forming module. The context-based object representation output may be received by the SSM compilation module for preparation to be shared to other connected vehicles via the network connectivity module.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining embodiments of the present disclosure, it is noted that the terms "substantially" and "approximately" are utilized herein to represent the inherent degree of uncertainty that may be attributed to any quantitative comparison, value, measurement, or other representation. For example, a "substantially consistent yaw" may describe a yaw measurement that removes slight yaw movements due to slight lateral movement within lanes, lane changes, and the like.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A vehicle comprising:
a controller programmed to perform operations comprising:
   obtaining a data set representing an external object, the data set having a first set of features;
   obtaining a channel load about a radio frequency through which the data set may be transmitted;
   obtaining context information about a road on which the vehicle is located, the context information including an indication that the road is a single road at a current position of the vehicle, an indication that there are multiple levels of road at the current position, or an indication that the road is flat at the current position; and
   processing the data set representing the external object based on the channel load and the context information to generate a reduced data set representing the external object, the reduced data set having a second set of features fewer than the first set of features.

2. The vehicle of claim 1, wherein the first set of features comprises one or more of:
   translational position features including at least one of a position, a velocity, or an acceleration of the external object by an object sensor, each comprising three dimensions; and
   rotational position features including at least one of Euler angles, an angular velocity, or an angular acceleration of the external object by the object sensor, each comprising three dimensions.

3. The vehicle of claim 2, wherein the second set of features comprises one or more of:
   at least one of the translational position features of the first set of features, each comprising one or two dimensions; and
   at least one of the rotational position features of the first set of features, each comprising one or two dimensions.

4. The vehicle of claim 1, wherein the channel load is derived from a channel busy ratio.

5. The vehicle of claim 4, wherein processing the data set comprises:
   generating the reduced data set in response to the channel busy ratio being between a first threshold and a second threshold, the second threshold being greater than the first threshold; and
   generating an emergency message in response to the channel busy ratio being greater than the second threshold.

6. The vehicle of claim 1, wherein obtaining the context information about the road comprises:
   generating at least one of a current position, a current speed, or a current heading of the vehicle with an environment sensor; and
   obtaining a road configuration information from a road database based on the current position.

7. The vehicle of claim 6, wherein processing the data set comprises:
   removing one or more of the first set of features to generate the second set of features of the reduced data set based on the road configuration information.

8. The vehicle of claim 7, wherein removing one or more of the first set of features comprises:
   removing features directed to a vertical direction in the first set of features to generate the reduced data set in response to the road configuration information indicating a single road at the current position; and
   maintaining the features directed to the vertical direction in the first set of features to generate the reduced data set in response to the road configuration information indicating that there are multiple levels of road at the current position.

9. The vehicle of claim 7, wherein processing the data set comprises:
   removing a pitch feature and a roll feature in the first set of features to generate the second set of features of the reduced data set in response to the context information indicating that road is flat at the current position.

10. The vehicle of claim 7, wherein removing one or more of the first set of features comprises:
    removing a velocity feature and an acceleration feature in the first set of features to generate the second set of features of the reduced data set in response to the context information indicating that the external object is a parked object.

11. The vehicle of claim 1, wherein the controller is programmed to perform operations further comprising:
    generating an initial metadata message describing the second set of features of the reduced data set that may be transmitted.

12. The vehicle of claim 1, wherein the controller is programmed to perform operations further comprising:
    generating a lookup table that associates the context information about the road with the second set of features of the reduced data set.

13. The vehicle of claim 1, wherein the context information includes an indication that the external object is a parked object.

14. A method comprising:
obtaining, with a sensor of a vehicle, a data set representing an external object, the data set having a first set of features;
obtaining, with a receiver of the vehicle, a channel load about a radio frequency through which the data set may be transmitted;
obtaining, with an environment sensor of the vehicle, context information about a road on which the vehicle is located, the context information including an indication that the road is a single road at a current position of the vehicle, an indication that there are multiple levels of road at the current position, or an indication that the road is flat at the current position; and
processing the data set representing the external object based on the channel load and the context information to generate a reduced data set representing the external object, the reduced data set having a second set of features fewer than the first set of features.

15. The method of claim 14, wherein the first set of features comprises one or more of:
translational position features including at least one of a position, a velocity, or an acceleration of the external object by an object sensor, each comprising three dimensions; and
rotational position features including at least one of Euler angles, an angular velocity, or an angular acceleration of the external object by the object sensor, each comprising three dimensions.

16. The method of claim 15, wherein the second set of features comprises one or more of:
at least one of the translational position features of the first set of features, each comprising one or two dimensions; and
at least one of the rotational position features of the first set of features, each comprising one or two dimensions.

17. The method of claim 14, wherein obtaining the context information about the road comprises:
generating at least one of a current position, a current speed, or a current heading of the vehicle with the environment sensor; and
obtaining a road configuration information from a road database based on the current position.

18. The method of claim 17, wherein processing the data set comprises:
removing one or more of the first set of features to generate the second set of features based on the road configuration information.

19. The method of claim 18, wherein removing one or more of the first set of features comprises:
removing features directed to a vertical direction in the first set of features to generate the reduced data set in response to the road configuration information indicating a single road at the current position; and
maintaining the features directed to the vertical direction in the first set of features to generate the reduced data set in response to the road configuration information indicating that there are multiple levels of road at the current position.

20. The method of claim 18, wherein processing the data set comprises:
removing a pitch feature and a roll feature in the first set of features to generate the second set of features of the reduced data set in response to the context information indicating that road is flat at the current position.

21. The method of claim 18, wherein removing one or more of the first set of features comprises:
removing a velocity feature and an acceleration feature in the first set of features to generate the second set of features of the reduced data set in response to the context information indicating that the external object is a parked object.

* * * * *